(12) United States Patent
Wories et al.

(10) Patent No.: US 7,693,911 B2
(45) Date of Patent: Apr. 6, 2010

(54) UNIFORM METADATA RETRIEVAL (75) Inventors: Michiel Wories, Redmond, WA (US); Ciprian Gerea, Seattle, WA (US); Marius Popa, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/784,799

(22) Filed: Apr. 9, 2007

(65) Prior Publication Data
US 2008/0250000 A1 Oct. 9, 2008

(51) Int. Cl.
G06F 17/30 (2006.01)
(52) U.S. Cl. ................................. 707/769; 707/760
(58) Field of Classification Search .................. 707/4, 707/103 Y
See application file for complete search history.

(56) References Cited

U.S. PATENT DOCUMENTS

| | | | |
|---|---|---|---|
| 6,253,239 B1 | 6/2001 | Shklar et al. | |
| 6,681,227 B1 | 1/2004 | Kojima et al. | |
| 6,708,186 B1* | 3/2004 | Claborn et al. | 707/102 |
| 6,950,815 B2 | 9/2005 | Tijare et al. | |
| 7,139,746 B2 | 11/2006 | Shin et al. | |
| 2004/0019658 A1 | 1/2004 | Plastina et al. | |
| 2004/0128306 A1* | 7/2004 | Shanmugasundaram et al. | 707/102 |
| 2004/0172382 A1 | 9/2004 | Prang et al. | |
| 2004/0193575 A1 | 9/2004 | Chen et al. | |
| 2005/0229158 A1 | 10/2005 | Thusoo et al. | |
| 2006/0074953 A1 | 4/2006 | Dettinger et al. | |
| 2006/0265385 A1 | 11/2006 | Agrawal et al. | |

OTHER PUBLICATIONS

Das et al., "ACQUIRE: agent-based complex query and information retrieval engine", Proceedings of the first international joint conference on Autonomous agents and multiagent systems, Jul. 2002, p. 631-638. Retrieved from the Internet<URL: http://portal.acm.org/ft_gateway.cfm?id=544891&type=pdf&coll=ACM&dl=ACM&CFID=66900020&CFTOKEN=97260913>.*

Cheung et al., "The model-assisted global query system for multiple databases in distributed enterprises", ACM Transactions on Information Systems, vol. 14, Issue 4 (Oct. 1996), p. 421-470. Retrieved from the Internet<URL: http://portal.acm.org/ft_gateway.cfm?id=237499&type=pdf&coll=ACM&dl=ACM&CFID=66900020&CFTOKEN=97260913>.*

Kumar, et al., "MQEP: Metadata-based query evaluation of bi-labeled XML data", Date: Dec. 20-22, 2005, http://www.iiit.ac.in/comad2005b/papers/comad2005b_5.pdf.

Peig, et al., "Metadata interoperability and meta-search on the web", Date: Oct. 24-26, 2001, http://www.nii.ac.jp/dc2001/proceedings/product/paper-37.pdf.

* cited by examiner

*Primary Examiner*—Jean B. Fleurantin
*Assistant Examiner*—Dennis Myint (57) ABSTRACT

A method for uniform metadata retrieval generates an interface for requesting metadata from a relational database. A hierarchical metadata request can be received via the interface. The hierarchical metadata request can be translated into a relational database metadata request. The relational database metadata request is utilized to retrieve metadata from the relational database.

20 Claims, 8 Drawing Sheets

UNIFORM METADATA RETRIEVAL

BACKGROUND

Currently a database can be physically implemented in order to store an extremely voluminous amount of data. Furthermore, one common technique for organizing data stored by a database is referred to as a relational database, wherein the stored data is organized into different tables. Each table of data of the relational database can be interrelated to one or more additional tables of data. Moreover, it is appreciated that a wide variety of different types of information and data can be stored by a commonly shared relational database. For example, one type of data that can be stored by the relational database is referred to as metadata, which is generally understood to be information about other data. Therefore, metadata can be useful to the relational database user. As such, it can be desirable for the relational database user to search or query the relational database in order to retrieve metadata from it. One conventional approach for users to retrieve metadata associated with a relational database is to utilize a database searching application such as SQL (structured query language). However, there are disadvantages associated with these types of database searching applications.

For example, one of the disadvantages is that the database user (or someone else) has to write complicated "select" statements, which the database engine will utilize to retrieve the metadata of interest. Note that in order to write the complicated "select" statements, the user typically consults the product documentation associated with the relational database to determine which tables contain the pieces of information for assembling the metadata query. As such, this process can be time consuming and expensive. Furthermore, the process is typically repeated to query another relational database for metadata since its relational organization is different from the first relational database.

As such, it is desirable to address one or more of the above issues.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for uniform metadata retrieval is disclosed. For example, a method for uniform metadata retrieval generates an interface for requesting metadata from a relational database. A hierarchical metadata request can be received via the interface. The hierarchical metadata request can be translated into a relational database metadata request. The relational database metadata request is utilized to retrieve metadata from the relational database.

Such a method for uniform metadata retrieval can provide predictability and discoverability of hierarchical metadata stored by a relational database. In this manner, the ease of querying the relational database for metadata can be improved.

DETAILED DESCRIPTION

Reference will now be made in detail to embodiments of the present technology for uniform metadata retrieval, examples of which are illustrated in the accompanying drawings. While the technology for uniform metadata retrieval will be described in conjunction with various embodiments, it will be understood that they are not intended to limit the present technology for uniform metadata retrieval to these embodiments. On the contrary, the presented embodiments of the technology for uniform metadata retrieval are intended to cover alternatives, modifications and equivalents, which may be included within the scope the various embodiments as defined by the appended claims. Furthermore, in the following detailed description, numerous specific details are set forth in order to provide a thorough understanding of embodiments of the present technology for uniform metadata retrieval. However, embodiments of the present technology for uniform metadata retrieval may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "generating", "determining", "performing", "translating", "utilizing", "presenting", "incorporating", "producing", "retrieving", "outputting", or the like, refer to the actions and processes of a computer system (such as computer 100 of FIG. 1), or similar electronic computing device. The computer system or similar electronic computing device can manipulate and transform data represented as physical (electronic) quantities within the computer system's registers and/or memories into other data similarly represented as physical quantities within the computer system memories and/or registers or other such information storage, transmission, or display devices. Some embodiments of the present technology for uniform metadata retrieval are also well suited to the use of other computer systems such as, for example, optical and virtual computers.

Example Computer System Environment

Figure 1:
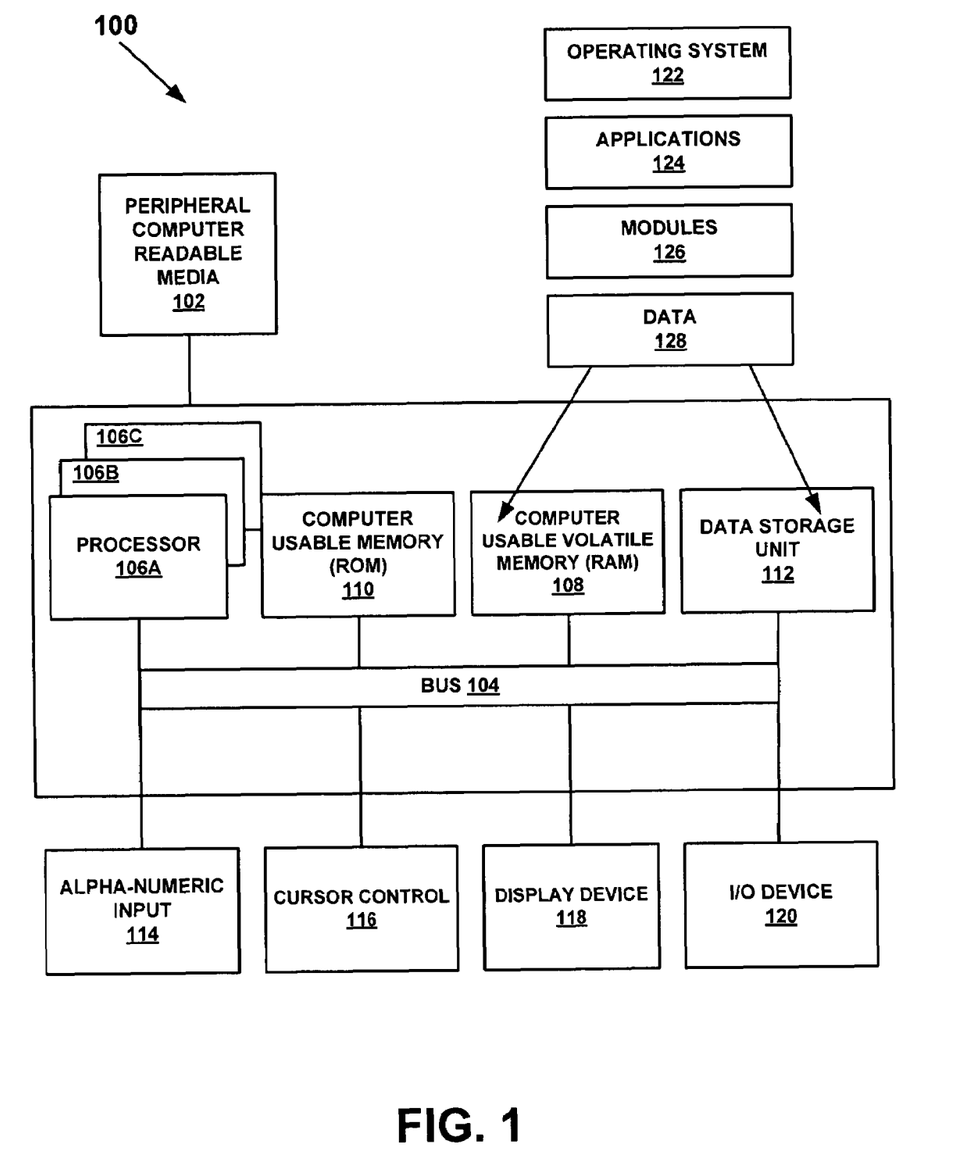
FIG. 1 is a block diagram of an example computer system used in accordance with embodiments of the present technology for uniform metadata retrieval.

With reference now to FIG. 1, all or portions of some embodiments of the technology for uniform metadata retrieval are composed of computer-readable and computer-executable instructions that reside, for example, in computer-usable media of a computer system. That is, FIG. 1 illustrates one example of a type of computer that can be used to implement embodiments, which are discussed below, of the present technology for uniform metadata retrieval. FIG. 1 illustrates an example computer system 100 used in accordance with embodiments of the present technology for uniform metadata retrieval. It is appreciated that system 100 of FIG. 1 is only an example and that embodiments of the present technology for uniform metadata retrieval can operate on or within a number of different computer systems including general purpose networked computer systems, embedded computer systems, routers, switches, server devices, client devices, various intermediate devices/nodes, stand alone computer systems, media centers, handheld computer systems, low-cost computer systems, high-end computer systems, and the like. As shown in FIG. 1, computer system 100 of FIG. 1 is well adapted to having peripheral computer readable media 102 such as, for example, a floppy disk, a compact disc, a DVD, and the like coupled thereto.

System 100 of FIG. 1 can include an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 can also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 can also include an optional alphanumeric input device 114 including alphanumeric and function keys coupled to bus 104 for communicating information and command selections to processor 106A or processors 106A, 106B, and 106C. System 100 can also include an optional cursor control device 116 coupled to bus 104 for communicating user input information and command selections to processor 106A or processors 106A, 106B, and 106C. System 100 of the present embodiment can also include an optional display device 118 coupled to bus 104 for displaying information.

Referring still to FIG. 1, optional display device 118 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (e.g., cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it is pointed out that a cursor can be directed and/or activated via input from alpha-numeric input device 114 using special keys and key sequence commands. System 100 is also well suited to having a cursor directed by other means such as, for example, voice commands. System 100 can also include an input/output (I/O) device 120 for coupling system 100 with external entities. For example, in one embodiment, I/O device 120 can be a modem for enabling wired and/or wireless communications between system 100 and an external network such as, but not limited to, the Internet.

Referring still to FIG. 1, various other components are depicted for system 100. In embodiments of the present technology, operating system 122 is a modular operating system that is comprised of a foundational base and optional installable features which may be installed in whole or in part, depending upon the capabilities of a particular computer system and desired operation of the computer system. Specifically, when present, all or portions of operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive (e.g., 102); and that further, operating system 122 may be accessed from a remote location via, for example, a coupling to the internet. In some embodiments, for example, all or part of the present technology for uniform metadata retrieval can be stored as an application 124 or module 126 in memory locations within RAM 108, media within data storage unit 112, and/or media of peripheral computer readable media 102. Likewise, in some embodiments, all or part of the present technology for uniform metadata retrieval may be stored at a separate location from computer 100 and accessed via, for example, a coupling to one or more networks or the internet.

Overview

In one embodiment of the present technology, a method can be utilized for retrieving metadata from a relational database by viewing the metadata as a tree from a logical point of view, and using a path expression that describes the location of the one or more metadata elements in the tree, and provides a method for translating the aforementioned path expression into a relational database query (e.g., SQL query) whose results can then be part of a uniform presentation.

Example System For Uniform Metadata Retrieval

Figure 2:
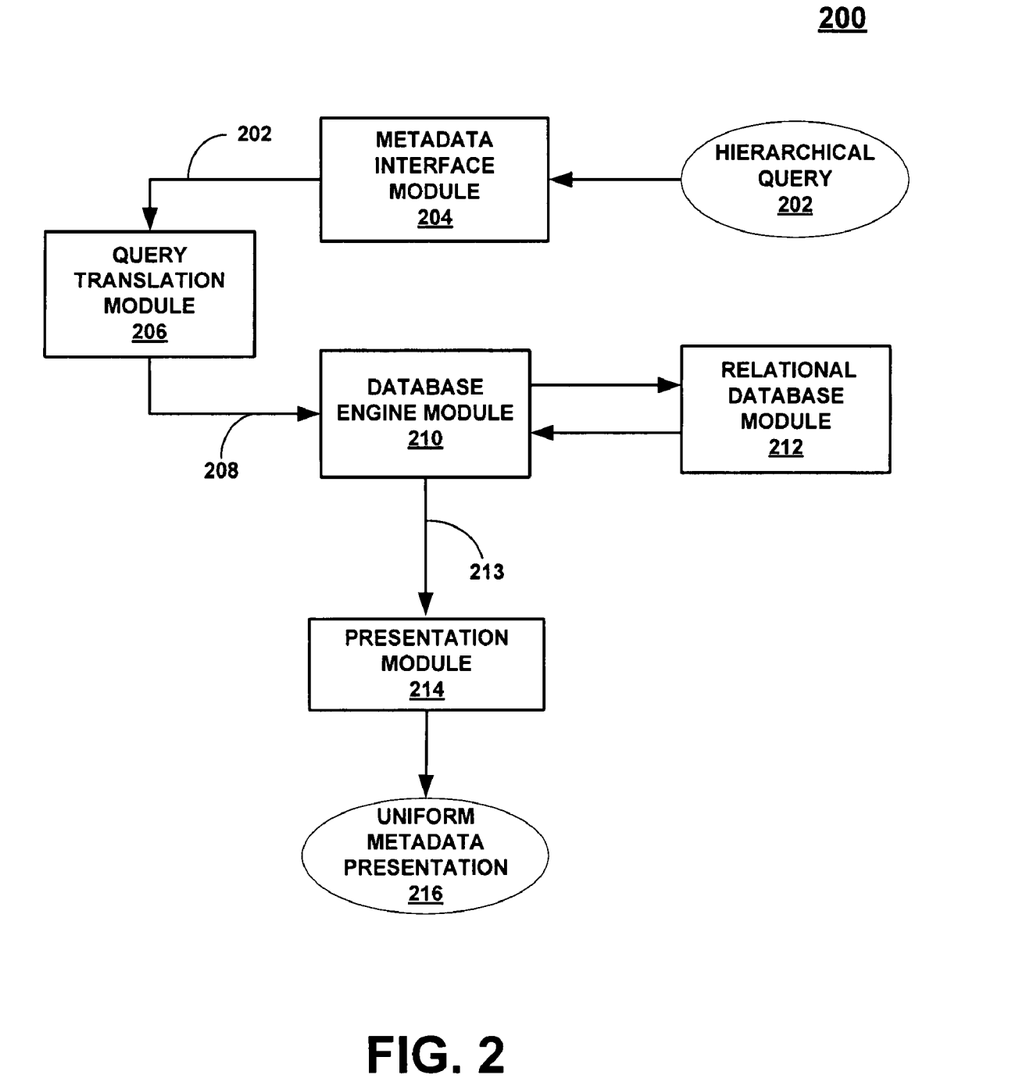
FIG. 2 is a block diagram of an example system for uniform metadata retrieval, according to one embodiment of the present technology.

FIG. 2 is a block diagram of an example system 200 for uniform metadata retrieval in accordance with an embodiment of the present technology. A metadata interface module 204 of system 200 can, in one embodiment, receive an electronic hierarchical metadata query or request 202. It is noted that the hierarchical metadata query 202 can be associated with metadata of a relational database module 212. The system 200 can view the metadata of the relational database module 212 as a tree from a logical point of view, and can uses a path expression (for example) that describes the location of the element in the tree, and can provide a method for translating the aforementioned path expression into a relational database query (e.g., SQL query) whose results are then uniformly presented or served to any users of system 200. As shown in FIG. 2, the system 200 can include, but is not limited to, a metadata interface module 204, a query translation module 206, a database engine module 210, a relational database module 212, and a presentation module 214.

For purposes of clarity of description, functionality of each of the components in FIG. 2 is shown and described separately. However, it is pointed out that in some embodiments, inclusion of a component described herein may not be required. It is also understood that, in some embodiments, functionalities ascribed herein to separate components may be combined into fewer components or distributed among a greater number of components. It is pointed out that in various embodiments, each of the modules of FIG. 2 can be implemented with software, or firmware, or electronic hardware, or electrical hardware, or any combination thereof.

As shown in FIG. 2, the metadata interface module 204 can be implemented to generate and receive one or more electronic metadata interfaces that can enable a user to request or query for metadata of the relational database module 212. Note that the one or more electronic metadata interfaces generated by the metadata interface module 204 can be implemented in a wide variety of ways. For example in an embodiment, the metadata interface module 204 can generate and receive an electronic metadata interface that enables a hierarchical metadata query 202 of the relational database module 212. Furthermore, the hierarchical metadata query 202 can be implemented in a wide variety of ways. For example, the hierarchical metadata query 202 can be implemented to return all metadata column data (e.g., name of each column) associated with a particular table or particular tables of the relational database module 212. For instance in accordance with an embodiment, the following example code is for a function named "Fn_metadata" that performs that functionality:

---
Fn_metadata
---
create function fn_metadata (@urn nvarchar(2000)) returns table(col_xml xml)

--- wherein its argument is "@urn nvarchar(2000)" which is a path to the objects that are being queried within the relational database module 212. For more information regarding the "urn nvarchar(2000)" and what can be expressed with it, please refer to the "Example Query Translation" section herein. It is pointed out that the "urn nvarchar(2000)" in one embodiment can normally start at a Server level, but the context can be deduced so that instead of the following example code:

Server/Database[@Name='PDW']/Table [@Name='events']/Column the following shortened example code can be used:
Table[@Name='events']/Column since the identity of the database that is being query is typically known. However, it is noted that both versions are supported by an embodiment of the present technology. The following example Structured Query Language (SQL) query illustrates an implementation and utilization of the "Fn_metadata" function in accordance with an embodiment:

---
```
Select    xml_col.value('/Column/Name[1]', 'sysname'),
          xml_col.value('/ Column/ID[1]', 'int'),
          xml_col.value('/ Column/IsComputed[1]', 'bit'),
          . . . column list here
from sys.fn_metadata ( 'Table[@Name= "Events" and @Schema=
"PDW"]/Column')
```
---

Note that the hierarchical metadata query 202 can be implemented to return specific metadata column data (e.g., name of one or more columns) associated with a particular table or particular tables of the relational database module 212. For instance in accordance with an embodiment, the following example code is for a function named "Fn_metadata_ex" which performs that functionality:

---
Fn_metadata_ex
---
create function fn_metadata_ex (@request sys.Request) returns table(col_xml xml)

--- wherein its argument is "(@request sys.Request)" which is a data structure that describes the metadata request. It is pointed out that the "(@request sys.Request)" argument can offer more choices than the "@urn nvarchar(2000)" in filtering and ordering of the retrieved metadata results. For example, the following example SQL query illustrates the greater flexibility that the "Fn_metadata_ex" can provide in specifying how the retrieved metadata result set should appear:

---
```
declare @request sys.Request
select @request.SetUrn('Table[@Name="Events" and
   @Schema="PDW"]/Column')
select @request.AddField('Name')
select @request.AddField('ID')
select @request.AddField('IsComputed')
select @request.AddOrderBy('Name', 'Asc')
Select     xml_col.value('/COLUMN/Name[1]', 'sysname'),
           xml_col.value('/COLUMN/ID[1]', 'int'),
           xml_col.value('/COLUMN/IsComputed[1]', 'bit')
from fn_metadata_ex( @request )
```
---

As shown in FIG. 2, it is pointed out that the hierarchical metadata query 202 can be implemented to include a request that is a class that can be added to the relational database module 212 and/or server as a new data type. The request can function as a container composed of the "urn nvarchar(2000)" function, the list of fields to be retrieved for that particular object, and the list of fields on which the result set is to be ordered. For instance in accordance with an embodiment, the following example SQL code is for a function named "Request user-defined type" which performs the above functionalities:

---
Request user-defined type
---
```
public class Request
{
      Void AddField(string field);
      Void AddOrderBy(string field, OrderByDirection direction);
      Void SetUrn(string urn);
      Void SetRetrieveParentInfo(bool value);
}
```
--- wherein "AddField" is a function that defines which fields should be in the metadata result, "AddOrderBy" column is a function that defines which column will order the metadata, "SetUrn" is a function that defines the Uniform Resource Name (URN) for the path, and "SetRetrieveParentInfo" is a function that specify if information is desired about the logical parent of the current object to be present in the results. For example, in the query for column metadata information, the result may not be as useful if it is desirable to link it further with other tables, because it is missing the information about the table to which the columns belong to. In one embodiment, if this bit of the "SetRetrieveParentInfo" function is set to true, it indicates that information is desired about the logical parent of the current object to be present in the results. In one embodiment, if this bit of the "SetRetrieveParentInfo" function is set to false, it indicates that information is not desired about the logical parent of the current object in the results.

It is noted that the hierarchical metadata query 202 can be implemented to discover metadata associated with the relational database module 212. For instance in accordance with an embodiment, the following example code is for a function named "Fn_metadata_info" which performs that functionality:

---
Fn_metadata_info
---
create function fn_metadata_info (@urn nvarchar(2000), @details nvarchar(20)) returns table(name sysname, data_type int)
--- wherein the argument "@urn" is the path in the tree. Note that if this is NULL or an empty string, the "Fn_metadata_info" function will return all the possible root nodes, such as 'Server' or 'ReportServer', but is not limited to such. The "Fn_metadata_info" function also can include the argument "@details" which information is desired about that node. For example in an embodiment, one possible value is 'children' which returns all the possible children of that node, which can be the default in case the parameter is NULL or an empty string. In an embodiment, another possible value is 'fields' which can return all the fields that the node exposes. Note that by using the "Fn_metadata_info" function, it enables exploration of the logical tree and figure out its structure (e.g., when @details='children') and it is also possible to obtain a list of properties available for every kind of node (when @details='fields'). As such, the entire logical tree is discoverable and accessible in a uniform manner.

Within FIG. 2, the query translation module 206 of the system 200 can be coupled to receive the hierarchical metadata query or request 202 from the metadata interface module 204. The query translation module 206 can be implemented to translate the hierarchical metadata query 202 into a relational metadata database format query or request 208. In one embodiment, the relational metadata database format query 208 can be implemented in a format that is understood by the database engine module 210. It is pointed out that the query translation module 206 can be implemented to operate in a wide variety of ways. For example, the query translation module 206 can be implemented to operate in any manner as described in the "Example Query Translation" section herein, but is not limited to such. Once the relational metadata database format query 208 is produced, the query translation module 206 can output (or transmit or deliver or issue) the relational metadata database format query 208 to the database engine module 210.

The database engine module 210 can be coupled to the query translation module 206 and as such, can be configured for receiving the relational metadata database format query 208. Additionally, the database engine module 210 can be configured to utilize the received relational metadata database format query 208 in order to retrieve the requested metadata from the relational database module 212. Once the database engine module 210 retrieves the requested metadata from the relational database module 212, the database engine module 210 can output or transfer the retrieved metadata 213 to the presentation module 214.

Within FIG. 2, the presentation module 214 can be coupled to the database engine module 210 and as such, can be configured for receiving the retrieved metadata 213. Moreover, the presentation module 214 can be configured to incorporate the retrieved metadata 213 into a uniform (or consistent or standardized) metadata presentation 216. In one embodiment, the presentation module 214 can be configured to output the uniform metadata presentation 216 so that it can be viewed and/or utilized by any user of system 200. For example in an embodiment, the presentation module 214 can output the uniform metadata presentation 216 to a display device (e.g., 118) so that it may to be viewed by a user. It is noted that the presentation module 214 can implement the uniform metadata presentation 216 in a wide variety of ways. For example, the uniform metadata presentation 216 can be implemented as, but is not limited to, a table that includes the retrieved metadata, an Extensible Markup Language (XML) document, an electronic presentation, an XML document that includes a table of the retrieved metadata, and the like.

Note that the presentation module 214 can implement the uniform metadata presentation 216 in a wide variety of ways for the "Fn_metadata" function, described herein. For example in one embodiment, the code "table(col_xml xml)" of the example "Fn_metadata" function above indicates that the retrieved metadata will be returned as an XML document. As such, this enables uniform handling of various schemas. XML can be utilized since the definition of the table returned by this function can be fixed, but the content of the XML document can vary for every type queried. In an embodiment, the uniform metadata presentation 216 can be implemented with the following example code, wherein the root tag is the name of the element, and the inner tags are properties:

---
```
<Column>
    <Name>C1</Name>
    <ID>1</ID>
    <IsComputed>0</IsComputed>
</Column>
```
---

It is pointed out that the presentation module 214 can implement the uniform metadata presentation 216 in a wide variety of ways for the "Fn_metadata_ex" function, described herein. For example, the uniform metadata presentation 216 for the "Fn_metadata_ex" function can be implemented in any manner similar to the uniform metadata presentation 216 for the "Fn_metadata" function described herein, but is not limited to such.

Note that the metadata system 200 can include one or more other modules, which are not shown.

Example Methods of Operation

Figure 3:
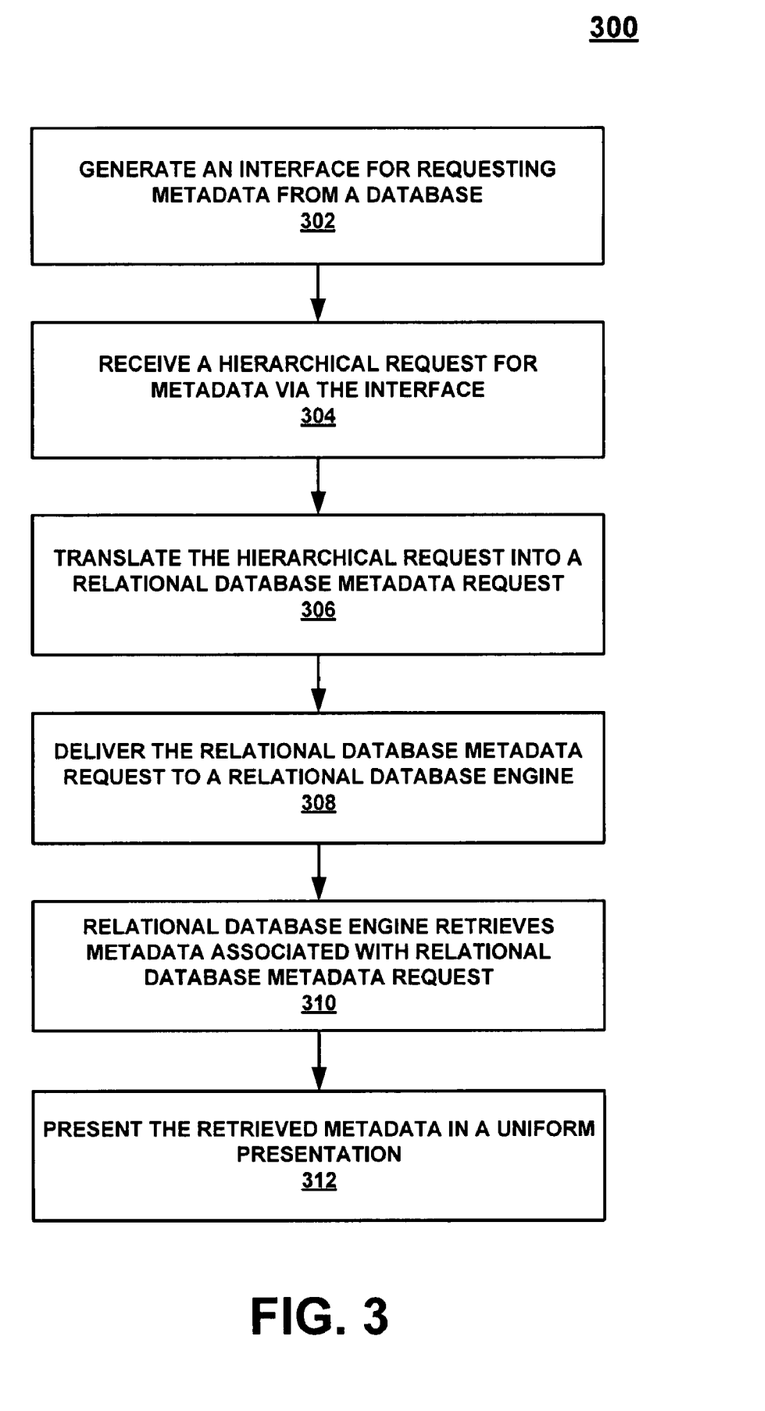
FIG. 3 is an example flow diagram of operations performed in accordance with one embodiment of the present technology.

The following discussion sets forth in detail the operation of some example methods of operation of embodiments of the present technology for uniform metadata retrieval. FIG. 3 is a flow diagram of an example method 300 for uniform metadata retrieval in accordance with various embodiments of the present technology. Flow diagram 300 includes processes that, in various embodiments, are carried out by a processor(s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagram 300, such operations are examples. Method 300 may not include all of the operations illustrated by FIG. 3. Also, embodiments are well suited to performing various other operations or variations of the operations recited in flow diagram 300. Likewise, the sequence of the operations of flow diagrams 300 can be modified. It is appreciated that not all of the operations in flow diagram 300 may be performed. It is noted that the operations of method 300 can be performed by software, by firmware, by electronic hardware, or by any combination thereof.

Specifically, method 300 can include generating an interface for requesting metadata from a relational database. A hierarchical request or query for metadata can be received via the interface. The hierarchical request can be translated into a relational database format request or query. The translated metadata request can be delivered to a relational database engine. The database engine can retrieve any metadata from the database that is associated with the translated metadata request. The retrieved metadata can be presented in a uniform presentation.

At operation 302 of FIG. 3, an interface (e.g., 204) can be generated for requesting metadata from a relational database (e.g., 212). It is noted that operation 302 can be implemented in a wide variety of ways. For example, operation 302 can be implemented in any manner similar to that described herein, but is not limited to such.

At operation 304, a hierarchical request or query (e.g., 202) for metadata can be received via the interface. It is pointed out that operation 304 can be implemented in a wide variety of ways. For example, operation 304 can be implemented in any manner similar to that described herein, but is not limited to such.

At operation 306 of FIG. 3, the hierarchical metadata request or query (e.g., 202) can be translated into a relational database metadata format request or query (e.g., 208). Note that operation 306 can be implemented in a wide variety of ways. For example, operation 306 can be implemented in any manner similar to that described herein, but is not limited to such.

At operation 308, the relational database metadata format request (e.g., 208) can be delivered to a relational database engine (e.g., 210). It is noted that operation 308 can be implemented in a wide variety of ways. For example, operation 308 can be implemented in any manner similar to that described herein, but is not limited to such.

At operation 310 of FIG. 3, the database engine can retrieve any metadata (e.g., 213) from the database that is associated with the relational database metadata format request or query. It is pointed out that operation 310 can be implemented in a wide variety of ways. For example, operation 310 can be implemented in any manner similar to that described herein, but is not limited to such.

At operation 312, the retrieved metadata (e.g., 213) can be presented in a uniform (or consistent or standardized) presentation (e.g., 216). Note that operation 312 can be implemented in a wide variety of ways. For example, operation 312 can be implemented in any manner similar to that described herein, but is not limited to such. At the completion of operation 312, process 300 can be exited.

Figure 4:
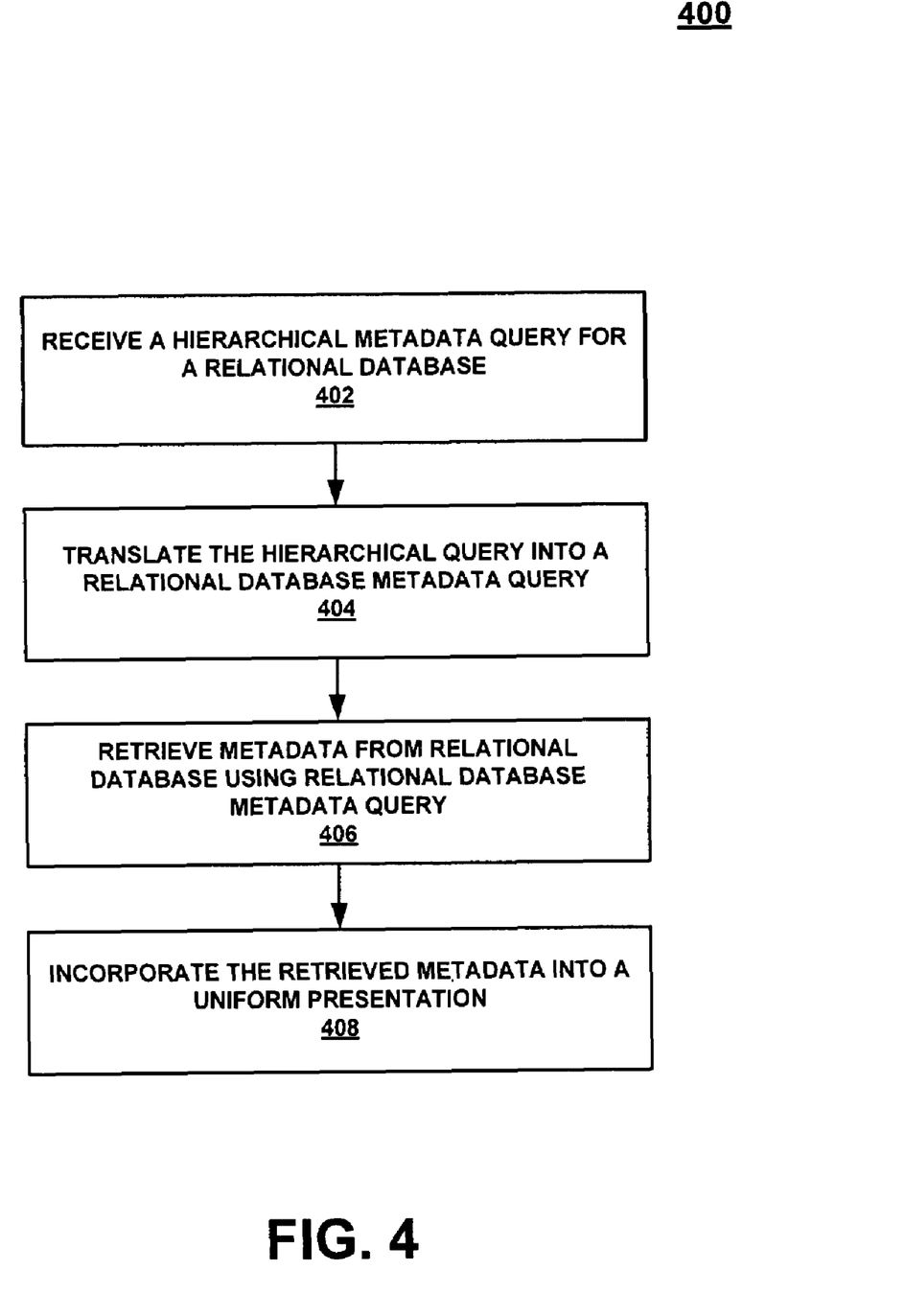
FIG. 4 is another example flow diagram of operations performed in accordance with one embodiment of the present technology.

FIG. 4 is a flow diagram of an example method 400 for uniform metadata retrieval in accordance with various embodiments of the present technology. Flow diagram 400 includes processes that, in various embodiments, are carried out by a processor(s) under the control of computer-readable and computer-executable instructions (or code), e.g., software. The computer-readable and computer-executable instructions (or code) may reside, for example, in data storage features such as computer usable volatile memory 108, computer usable non-volatile memory 110, peripheral computer-readable media 102, and/or data storage unit 112 of FIG. 1. The computer-readable and computer-executable instructions (or code), which may reside on computer useable media, are used to control or operate in conjunction with, for example, processor 106A and/or processors 106A, 106B, and 106C of FIG. 1. However, the computing device readable and executable instructions (or code) may reside in any type of computing device readable medium. Although specific operations are disclosed in flow diagram 400, such operations are examples. Method 400 may not include all of the operations illustrated by FIG. 4. Also, embodiments are well suited to performing various other operations or variations of the operations recited in flow diagram 400. Likewise, the sequence of the operations of flow diagrams 400 can be modified. It is appreciated that not all of the operations in flow diagram 400 may be performed. It is noted that the operations of method 400 can be performed by software, by firmware, by electronic hardware, or by any combination thereof.

Specifically, method 400 can include receiving a hierarchical metadata query for querying metadata from a relational database. The hierarchical query can be translated into a relational database metadata query. Metadata can be retrieved from the relational database using the relational database metadata query. The retrieved metadata can be incorporated into a uniform presentation.

At operation 402 of FIG. 4, a hierarchical metadata query (e.g., 202) can be received for querying metadata from a relational database (e.g., 212). It is noted that operation 402 can be implemented in a wide variety of ways. For example, operation 402 can be implemented in any manner similar to that described herein, but is not limited to such.

At operation 404, the hierarchical metadata query (e.g., 202) can be translated into a relational database metadata query (e.g., 208). Note that operation 404 can be implemented in a wide variety of ways. For example, operation 404 can be implemented in any manner similar to that described herein, but is not limited to such.

At operation 406, metadata (e.g., 213) can be retrieved from the relational database (e.g., 212) using the relational database metadata query. It is pointed out that operation 406 can be implemented in a wide variety of ways. For example, operation 406 can be implemented in any manner similar to that described herein, but is not limited to such.

At operation 408, the retrieved metadata (e.g., 213) can be incorporated into a uniform (or consistent or standardized) presentation (e.g., 216). Note that operation 408 can be implemented in a wide variety of ways. For example, operation 408 can be implemented in any manner similar to that described herein, but is not limited to such. At the completion of operation 408, process 400 can be exited.

Example Query Translation

Figure 5:
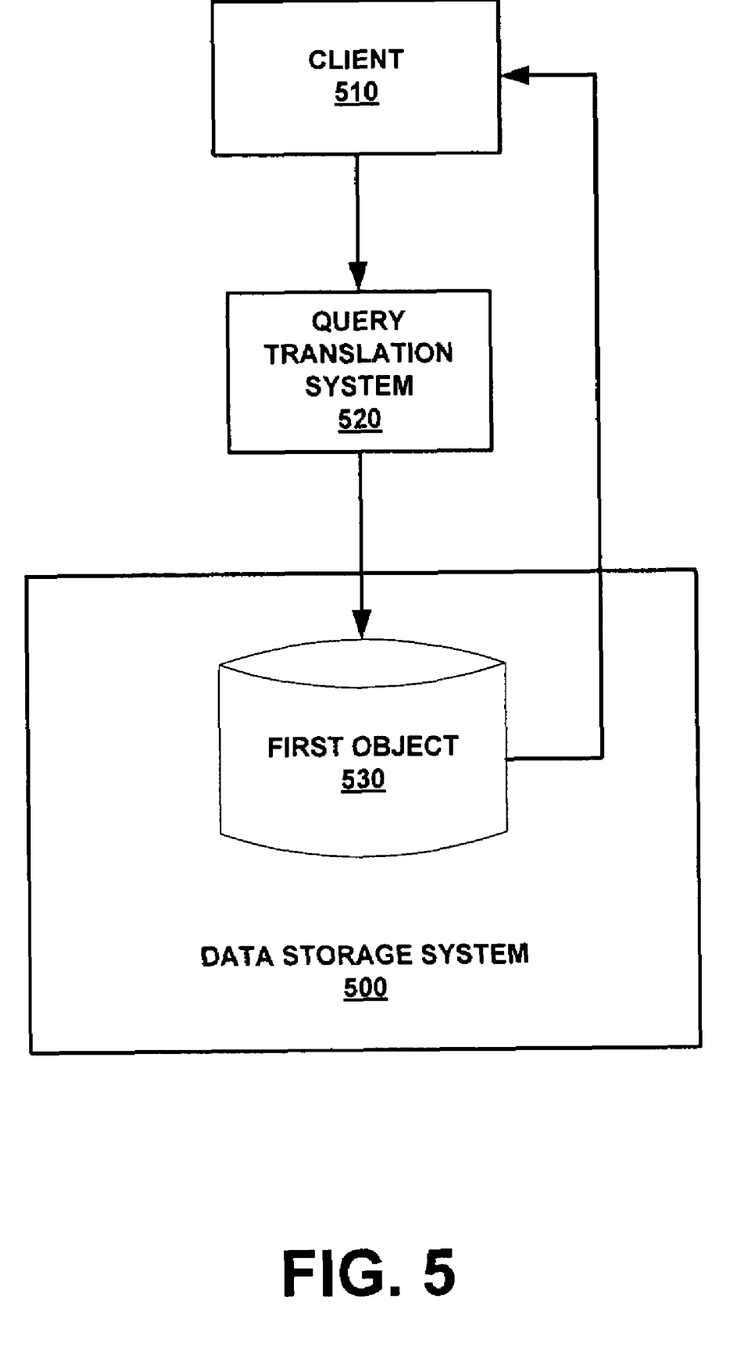
FIG. 5 is a block diagram of an example system for generating a query for execution on an object in accordance with an embodiment of the present technology.

A block diagram of an example system for generating a query for execution on an object in accordance with the present technology is shown in FIG. 5. As shown, the system includes client computing device 510, query translation system 520, data storage system 500, and first object 530. As should be appreciated, data storage system 500 may include any number of additional objects (not shown).

Generally, client 510 generates a first query written in a uniform format that is not unique to a particular object. Client 510 submits the first query to query translation system 520. Query translation system 520 translates the first query into a request for information formatted for processing on first object 530. Query translation system 520 submits the request to first object 530. First object 530 processes the request and may return results of the second query to client 510.

As shown in FIG. 5, client 510 generates a first query and submits the first query to query translation system 520. The first query is written in a uniform format that is not unique to a particular object. The first query includes a plurality of classes of objects such as, for example, the classes of objects in a data storage system, including a Database Management System (DBMS), a database, and data tables. Each object has an associated set of properties. For example, a DBMS may have properties such as name, identifier, and version. A database may have properties such as size and space available. A data table may have properties such as creation date and row count.

The first query also includes a plurality of filters. Each filter corresponds to an associated class of objects and specifies selected objects in its associated class of objects. A filter may be "empty", meaning that all objects in the filter's associated class of objects are selected.

The first query may be either a general query or a restricted query. A general query includes an empty filter and requests information about all objects in a class of objects, while a restricted query requests information only about selected objects. An example general query and restricted query are shown below:

General Query
DBMS[@Version=8.0]/Database[@Name='master']/Table
Restricted Query
DBMS[@Version=8.0]/Database[@Name='master']/Table[@RowCount=1 00]

According to the example set forth above, the general query will return information about all data tables that are stored at the database named "Master" which is accessed through the DBMS version "8.0". The restricted query will return information about only data tables with a row count of 100 that are stored at the database named "Master" which is accessed through the DBMS version "8.0".

The first query may request various types of information about the selected objects. For example, a "self-discovery" query requests which properties are discoverable for the selected objects. Additionally a "data request" query may be used to follow up a self-discovery query. The data request query requests information about specified properties of the selected objects. For example, a self-discovery query may request which properties are discoverable for a selected table, and the results of the self-discovery query may specify that creation date and row count are discoverable properties. A data request query may then request the row count of the selected table.

After the first query has been generated at client 510, the first query is submitted to query translation system 520. An example query translation system 520 is described in detail below with reference to FIG. 6. Generally, query translation system 520 translates the first query to a request for information formatted for processing on first object 530. For example, if first object 530 is a DBMS that executes queries written in Structured Query Language (SQL), then query translation system 520 will translate the first query into a second query written in SQL.

After the request for information has been generated, it is submitted to first object 530 for processing at first object 530. First object 530 is an object on which requests for information about objects in data storage system 500 may be processed. For example, first object 530 may be a DBMS, an on-line analytical processing (OLAP) server, or a management instrumentation server. After the request for information has been executed at first object 530, the request results may be submitted to client 510. For a self-discovery query, the results include the discoverable properties of the selected objects. For a data request query, the results include information about specified properties of the selected objects. An example first query and corresponding results are shown below:

First Query:
DBMS/Database[@Name='master']/Table[@Name='Sales']
Request properties: Name, Creation Date, Row Count

| Name | Creation Date | Row Count |
|---|---|---|
| Sales | Mar. 1, 2003 | 100 |

The example results shown above include information about the specified properties "Name, Creation Date, and Row Count" for the selected "Sales" table.

Figure 6:
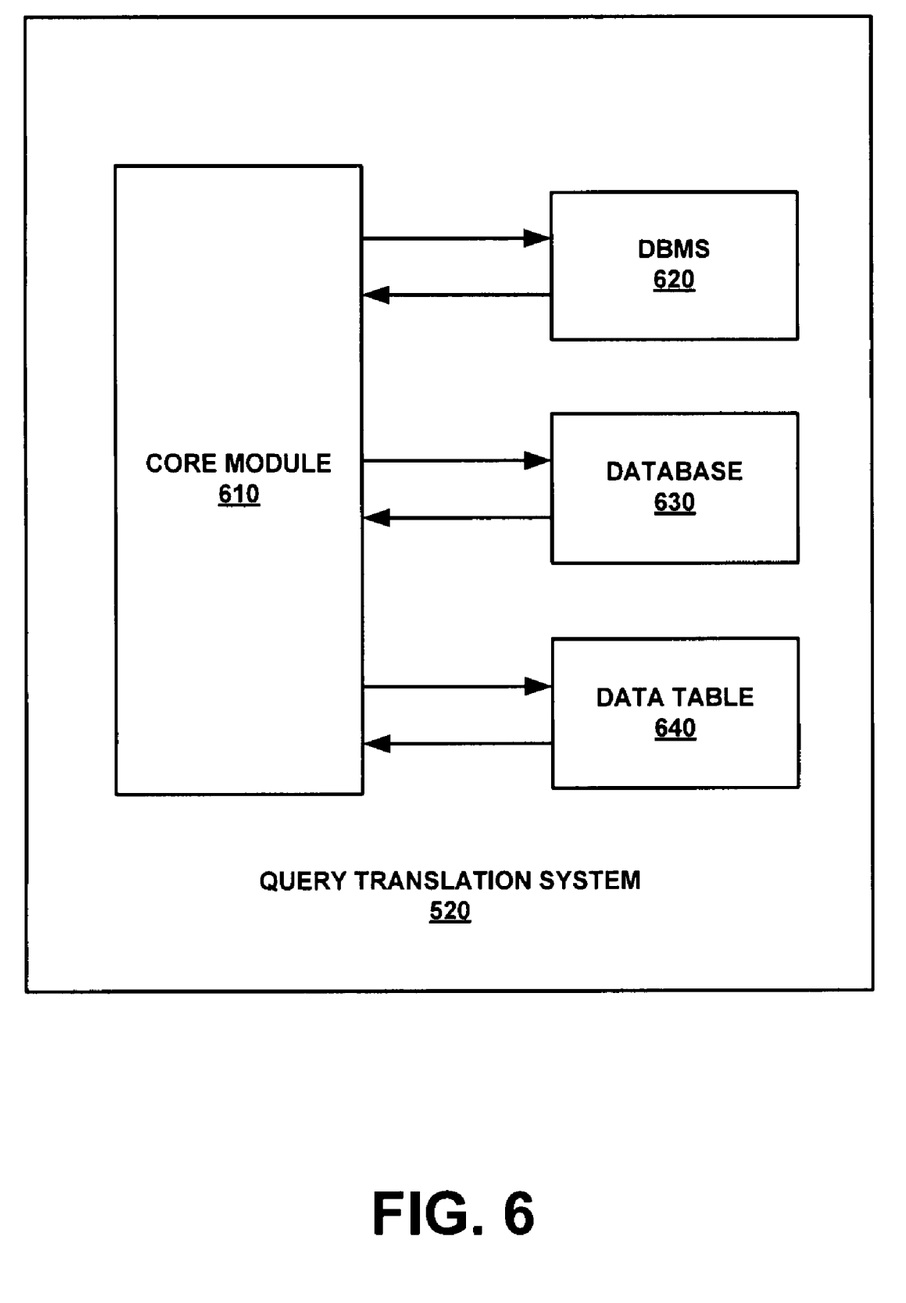
FIG. 6 is a block diagram of an example query translation system in accordance with an embodiment of the present technology.

A block diagram of an example query translation system in accordance with the present technology is shown in FIG. 6. As shown, example query translation system 520 includes a core module 610 and a plurality of objects including DBMS 620, database 630, and data table 640. As should be appreciated, query translation system 520 may be modified to include additional objects depending on the data storage system for which it is configured. For example, if query translation system 520 were configured for a data storage system including an on-line analytical processing (OLAP) server and/or instrumentation management server connected to DBMS 100, then query translation system 520 may be modified to include an additional OLAP server and/or instrumentation management server. Furthermore, if the data storage system included information corresponding to columns of data tables, then query translation system 520 may be modified to include additional columns.

Query translation server 520 may be configured using a configuration file stored at core module 610. Such a configuration file is preferably written in extensible markup language (XML). The configuration file specifies the hierarchy of objects within the data storage system. If a class of objects is added to the data storage system, the configuration file may be edited to include the added class of objects and their corresponding properties. An example configuration file corresponding to a data storage system for which query translation system 520 is configured is shown below:

```
<?xml version="1.0"?>
<objects>
  <object type="Server" assembly="Microsoft.SqlServer.SqlEnum"
    implement="Microsoft.SqlServer.Management.Smo.DatabaseLevel"
    cfg="Server.xml">
    <object type="Database" assembly="Microsoft.SqlServer.SqlEnum"
      implement="Microsoft.SqlServer.Management.Smo.DatabaseLevel"
      cfg="xml='Database.xml' last='true'">
      <object type="Table"
        assembly="Microsoft.SqlServer.SqlEnum"
        implement="Microsoft.SqlServer.Management.Smo.SqlObject"
        cfg="Table.xml">
  </object>
  </object>
</objects>
```

Figure 7:
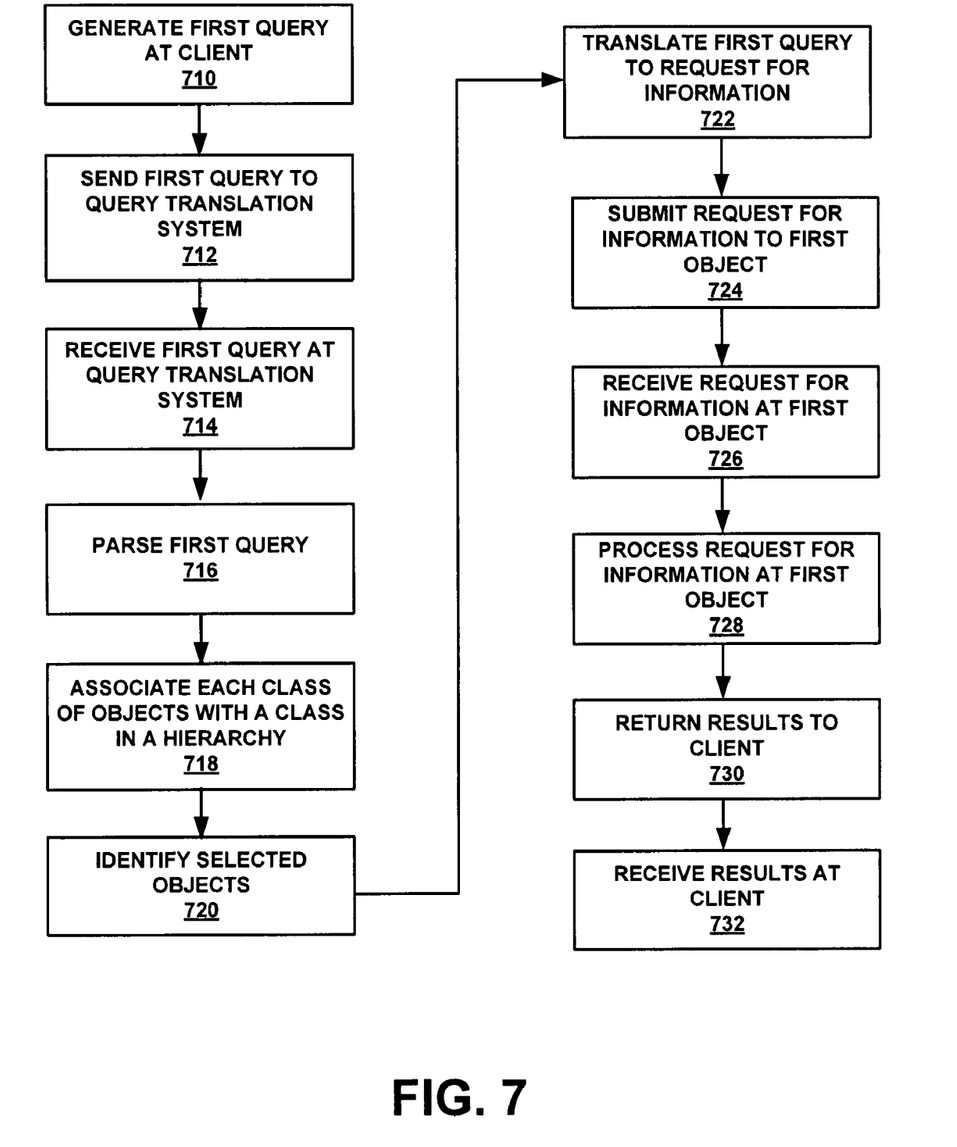
FIG. 7 is a flow diagram of an example method for generating a request for information about selected objects in accordance with an embodiment of the present technology.

A flowchart of an example method for generating a request for information about selected objects in accordance with the present technology is shown in FIG. 7. Generally, a first query may be generated at client 510. The first query is written in a uniform format that is not unique to a particular object. The first query is submitted to a query translation system 520, which translates the first query to the request for information, which is formatted for processing on first object 530. The request is submitted to first object 530 for execution at first object 530. Results of the request may be returned back to client 510.

As shown in FIG. 7, at step 710, client 510 generates a first query. The first query is written in a uniform format that is not unique to a particular object. The first query includes a plurality of classes of objects and a plurality of filters. Each filter corresponds to an associated class of objects and specifies selected objects in the corresponding class of objects.

The first query may be a self-discovery query that requests discoverable properties of selected objects. The first query may also be a data request query that requests information about specified properties of selected objects.

At step 712, client 510 sends the first query to query translation system 520, and, at step 714, the first query is received at query translation system 520.

At step 716, query translation system 520 parses the first query to identify the plurality of classes of objects and the plurality of filters.

At step 718, query translation system 520 associates each class of objects with a class in a hierarchy of objects. For example, for a first query including a DBMS class, a database class, and a data table class, query translation system 520 may associate the DBMS with a first class, the database with a second class, and the data tables with a third class. The hierarchy of objects may be specified in a configuration file that is preferably stored at query translation system 520.

At step 720, query translation system 520 identifies the selected objects based on the plurality of filters. An example method for identifying selected objects is discussed in detail below with reference to FIG. 8.

At step 722, query translation system 520 translates the first query to a request for information formatted for execution on first object 530, which is the object associated with the first class at step 718.

At step 724, query translation system 520 submits the request for information to first object 530, and, at step 726, the request for information is received at first object 530. At step 728, the request for information is processed at first object 530. At step 730, the results of the request for information are sent to client 510, and, at step 732, the results are received at client 510. Client 510 may display results to the user and may store results in a memory for further processing. The results may be used in various aspects of database administration and query optimization.

Figure 8:
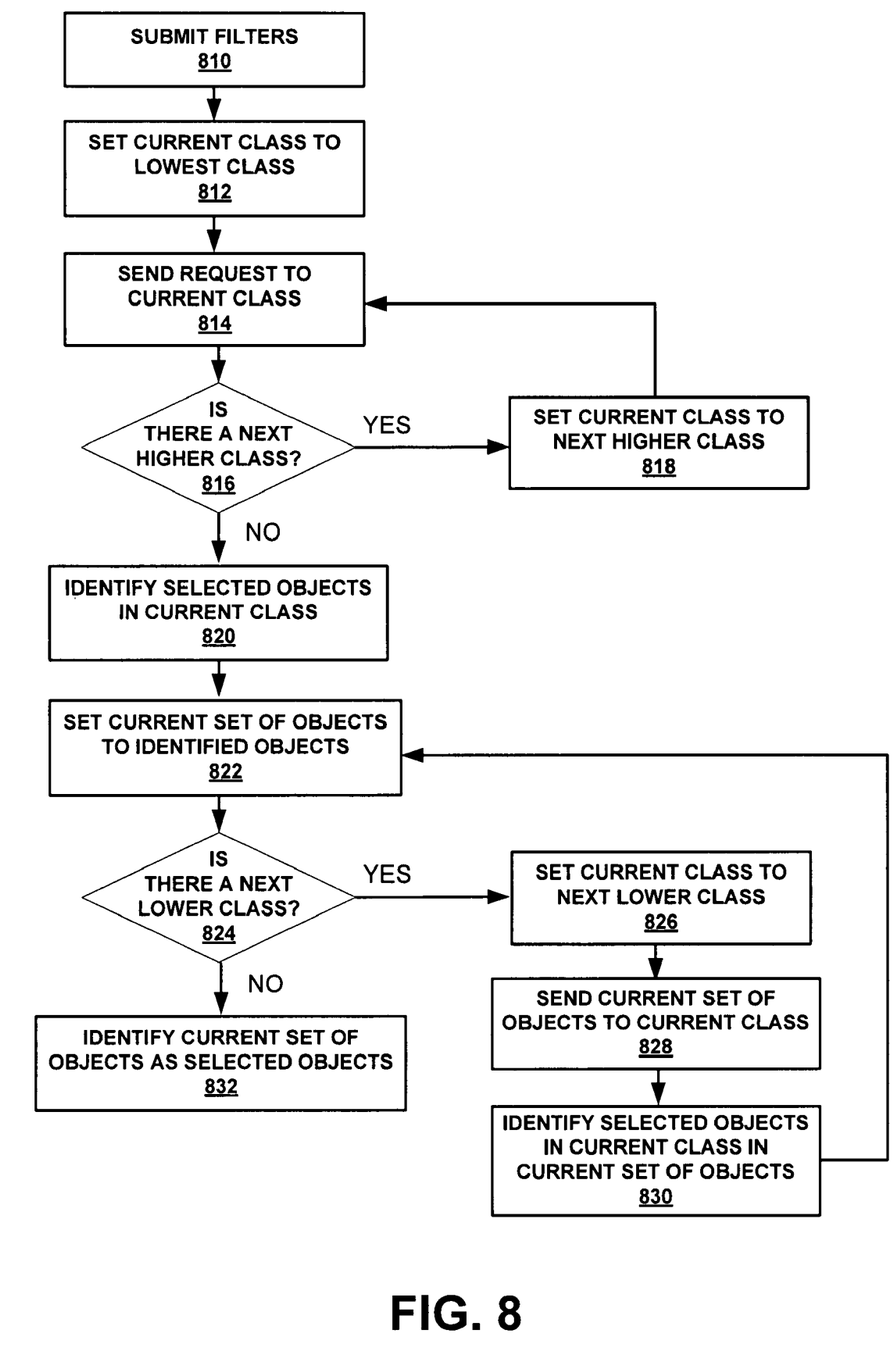
FIG. 8 is a flow diagram of an example method for identifying selected objects in accordance with an embodiment of the present technology.

A flowchart of an example method for identifying selected objects in accordance with the present technology is shown in FIG. 8. Generally, core module 610 sends each filter to its associated class of objects. Core module 610 then sends a request for selected objects to the lowest class of objects. The lowest class of objects, in turn, passes the request to each next higher class until the request reaches the highest class of objects. The highest class of objects identifies the selected objects in the highest class of objects specified in the corresponding filter. The highest class of objects, in turn, passes the identified objects to each lower class of objects. Each lower class identifies selected objects in its class of objects present on the identified objects passed from the previous higher class. Finally, the lowest class identifies selected objects in the lowest class of objects and submits the identified objects to core module 610.

As shown in FIG. 8, at step 810, core module 610 submits each filter to its corresponding class of objects 620-640.

At step 812, core module 610 sets a current class to the lowest class of objects 620. At step 814, core module 610 sends a request for selected objects to the current class. At step 816, it is determined if there is a next higher class of objects. For example, if the current class is set to data table 640, then the next higher class of objects is database 630. If the current class of objects is DBMS 620, then there is no next higher class of objects.

If there is a next higher class of objects, then, at step 818, current class is set to the next higher class of objects and the method returns to step 814.

If there is not a next higher class of objects, then, at step 820, the current class of objects identifies the selected objects in the current class specified by the corresponding filter. For example, for the first query, "DBMS[@Version=8.0]" the selected objects for DBMS class 620 are all DBMS's that are version "8.0".

At step 822, a current set of objects is set to the identified objects. At step 824, it is determined if there is a next lower class of objects. For example, if the current class is set to DBMS 620, then the next lower class of objects is database 630. If the current class of objects is data table 640, then there is no next lower class of objects.

If there is a next lower class of objects, then, at step 826, the current class is set to the next lower class of objects. At step 828, the current set of objects is sent to the current class. At step 830, the current class of objects identifies selected objects in the current class of objects specified by the corresponding filter that are present in the current set of objects. For example, for the first query, "DBMS[@Version=8.0]/Database[@Name='master']" if the current class of objects is database class 630 and the current set of objects are all DBMS's that are version "8.0", then the selected objects present in the current set of objects are all databases named "Master" that are present on a DBMS that is version "8.0". After execution of step 830, the method returns to step 822.

If there is not a next lower class of objects, then, at step 832, the current set of objects is identified as the selected objects for the request for information.

It is noted that while various embodiments of the present technology is described above in terms of DBMS object modules, a database object module, and a data table object module, these various embodiments can be implemented with any number of object modules corresponding to any associated objects.

Example embodiments of the present technology for uniform metadata retrieval are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for uniform metadata retrieval, said method comprising:

generating metadata interface for requesting metadata from a relational database;

receiving a hierarchical metadata request via said metadata interface, said hierarchical metadata request is in a uniform format that is not unique to a particular object, said hierarchical metadata request comprises a plurality of classes of objects and a plurality of filters;

translating said hierarchical metadata request into a relational database metadata request, said translating comprises:

a translating system submitting each filter of said plurality of filters to its corresponding class of objects within said translating system;

said translating system setting a current class to the lowest class of objects of said translating system;

said translating system determining if there is a next higher class of objects; and utilizing said relational database metadata request to retrieve metadata from said relational database.

2. The computer-implemented method as recited in claim 1, further comprising:

presenting said retrieved metadata in a uniform presentation.

3. The computer-implemented method as recited in claim 2, wherein said uniform presentation comprises an Extensible Markup Language (XML) document.

4. The computer-implemented method as recited in claim 1, wherein said hierarchical metadata request comprises a request for metadata about a column of a table of said relational database.

5. The computer-implemented method as recited in claim 1, wherein said hierarchical metadata request comprises a request for metadata about a structure of a node of said relational database.

6. The computer-implemented method as recited in claim 1, wherein said hierarchical metadata request comprises a request for metadata about a field of a node of said relational database.

7. The computer-implemented method as recited in claim 1, wherein said relational database metadata request comprises a Structured Query Language (SQL) query.

8. An electronic system for uniform metadata retrieval, said electronic system comprising:

a metadata interface module configured for receiving a hierarchical metadata query, said hierarchical metadata query is in a uniform format that is not unique to a particular object, said hierarchical metadata query comprises a plurality of classes of objects and a plurality of filters;

a query translation module coupled with said metadata interface module, said query translation module configured for receiving said hierarchical metadata query and configured for translating the hierarchical metadata query into a relational database metadata request, said translating comprises:

said query translation module configured for submitting each filter of said plurality of filters to its corresponding class of objects within said query translation module;

said query translation module configured for setting a current class to the lowest class of objects of said query translation module;

said query translation module configured to determine if there is a next higher class of objects; and a database engine module coupled with said query translation module, said database engine module configured for receiving said relational database metadata request and configured for utilizing said relational database metadata request to retrieve metadata from said relational database.

9. The electronic system of claim 8, further comprising:

a presentation module coupled with said database engine module, said presentation module configured for receiving said retrieved metadata and configured for incorporating said retrieved metadata into a uniform presentation.

10. The electronic system of claim 9, wherein said uniform presentation comprises an Extensible Markup Language (XML) document.

11. The electronic system of claim 8, wherein said hierarchical metadata request comprises a request for metadata about a column of a table of said relational database.

12. The electronic system of claim 8, wherein said hierarchical metadata request comprises a request for metadata about a structure of a node of said relational database.

13. The electronic system of claim 8, wherein said hierarchical metadata request comprises a request for metadata about a field of a node of said relational database.

14. The electronic system of claim 8, wherein said relational database metadata request comprises a Structured Query Language (SQL) query.

15. A computer-readable medium having computer-executable instructions for performing a method for uniform metadata retrieval, said instructions comprising:

receiving a hierarchical metadata query for querying metadata from a relational database, said hierarchical metadata query is in a uniform format that is not unique to a particular object, said hierarchical metadata query comprises a plurality of classes of objects and a plurality of filters;

translating said hierarchical metadata query into a relational database metadata query, said translating comprises:

a translating system submitting each filter of said plurality of filters to its corresponding class of objects within said translating system;

said translating system setting a current class to the lowest class of objects of said translating system;

said translating system determining if there is a next higher class of objects; and submitting said relational database metadata query to an object of said relational database; and retrieving metadata from said relational database using said relational database metadata query.

16. The computer-readable medium of claim 15, further comprising computer-executable instructions for:

incorporating said retrieved metadata into a uniform presentation.

17. The computer-readable medium of claim 16, wherein said uniform presentation comprises an Extensible Markup Language (XML) document.

18. The computer-readable medium of claim 15, wherein said hierarchical metadata query comprises a query for metadata about a table of said relational database.

19. The computer-readable medium of claim 15, wherein said hierarchical metadata query comprises a query for metadata about a structure of a node of said relational database.

20. The computer-readable medium of claim 15, wherein said hierarchical metadata query comprises a query for metadata about a field of a node of said relational database.

* * * * *